United States Patent

Kaplan et al.

[11] Patent Number: 5,335,158
[45] Date of Patent: Aug. 2, 1994

[54] HIGH EFFICIENCY LINEAR LIGHT SOURCE

[75] Inventors: Martin C. Kaplan, Rochester; Gary L. Erck, Webster; Richard J. Federico, Churchville, all of N.Y.

[73] Assignee: Eastman Kodak Company, Rochester, N.Y.

[21] Appl. No.: 887,197

[22] Filed: May 21, 1992

[51] Int. Cl.⁵ .................................................. F21V 7/00
[52] U.S. Cl. ...................................... 362/303; 362/302; 362/346; 362/32
[58] Field of Search ............... 362/32, 217, 223, 297, 362/301, 302, 303, 343, 346; 358/474, 475, 491; 250/228; 355/67, 71; 356/236

[56] References Cited

U.S. PATENT DOCUMENTS

| | | | |
|---|---|---|---|
| 3,488,117 | 1/1970 | Weisglass | 355/37 |
| 4,205,337 | 5/1980 | Millward | 358/54 |
| 4,287,414 | 9/1981 | Soo et al. | 250/227 |
| 4,371,258 | 2/1983 | Mast | 355/37 |
| 4,797,711 | 1/1989 | Sasada et al. | 355/32 |
| 4,866,593 | 9/1989 | Miura et al. | 346/107 |
| 4,868,383 | 9/1989 | Kurtz et al. | 250/228 |
| 5,103,385 | 4/1992 | Federico et al. | 362/298 |
| 5,215,370 | 6/1993 | Kaplan | 362/298 |

FOREIGN PATENT DOCUMENTS

0417856A1  9/1990  European Pat. Off.

OTHER PUBLICATIONS

"High Collection Nonimaging Optics", W. T. Welford & R. Winston, Harcourt Brace Jovanovich, 1989, pp. 1-7, 53-63, 72-81, 84-87.

Primary Examiner—Stephen F. Husar
Attorney, Agent, or Firm—David M. Woods

[57] ABSTRACT

A linear light source for a film scanner is disclosed which includes an elongated light integrating cavity, formed within a solid illumination body, having diffusely reflective walls. Light is introduced into the cavity through an input port, and an output beam of diffuse light is produced through a slot which is generally parallel to the longitudinal axis of the integrating cavity. In order to increase the efficiency of the light source, light is introduced into the cavity through a high collection non-imaging optical device formed as a hollow bore within the illumination body.

34 Claims, 5 Drawing Sheets

HIGH EFFICIENCY LINEAR LIGHT SOURCE

REFERENCE TO RELATED APPLICATION

Reference is made to U.S. application Ser. No. 797,661, entitled "Linear Light Source", filed on Nov. 25, 1991 in the name of Kaplan, now U.S. Pat. No. 5,215,370.

FIELD OF THE INVENTION

The present invention relates to a linear light source, and more particularly, to such a light source for use in a film scanner.

DESCRIPTION OF THE PRIOR ART

A film scanner typically includes a linear CCD image sensor which provides a serial output of signals representing successive lines of an image. For color applications, the film scanner can include an assembly of three separate CCD image sensors, one for each of the primary colors. The film is driven at a uniform rate past a light beam provided by an illumination system, and an illuminated section of the film is imaged onto each CCD image sensor. The film motion provides the frame scan, and the linear cycling of the elements in the image sensor provides the line scan. A scanner of this type is disclosed in U.S. Pat. No. 4,205,337.

It is common for film scanners to have an illumination system which produces a line of light across the film. The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g. scratches, will appear in an image produced from the scanned information.

An improved type of illumination system is disclosed in U.S. Pat. No. 4,868,383, which is assigned to the assignee of the present invention. This patent discloses a linear light source for a film scanner which includes means for generating an intense beam of light and an elongated cylindrical integrating cavity having diffusely reflective walls. The intense beam is introduced into the cavity through an input port and exits through an output slit which extends parallel to the longitudinal axis of the cylindrical integrating cavity. Such a light source produces a line of diffuse light which has a uniform linear and angular distribution, and excellent results can be obtained over a wide range of operational conditions.

It is generally recognized that a light-responsive system benefits from an optical arrangement that efficiently transmits light through the system. For instance, in U.S. Pat. No. 3,488,117, issued Jan. 6, 1970 to Weisglass, a high speed color enlarger increases light transmitting through a unit area of a transparency by utilizing a solid glass or acrylic light guide of conical shape to direct light from a light source into an integrating sphere. Light uniformly emerges from the exit aperture of the sphere over the full surface of the adjacent negative. The Weisglass arrangement, however, has disadvantages in that there are losses due to first reflection as light enters the solid light guide. Moreover, with a solid cone there is a tradeoff between the concentration power of the cone and the demands of internal reflection. As the taper of the cone is increased to make the output aperture of the cone smaller, and thus to increase output efficiency, a point is reached at which the angle of the input rays exceed the critical angle required for internal reflection. Further concentration of light, by furthering the taper of the cone, is then impeded as losses mount due to light rays escaping through the walls of the cone. Additionally, the solid guides are relatively costly to machine and manufacture, as well as to reliably support in relation to an integrating sphere. Furthermore, the Weisglass arrangement is not a linear light source, but an area illuminator for a negative transparency. There remains a need, therefore, in certain types of scanners, for a linear light source which is highly efficient and is constructed such that a high proportion of the light from a radiation source is included in the output beam from the integrating cavity.

SUMMARY OF THE INVENTION

It is an object of the present invention to overcome the problems in the prior art discussed above and to provide an improved linear light source for a film scanner.

It is a further object of the present invention to concentrate light into the smallest possible aperture of an integrating cavity.

In accordance with one aspect of the present invention, there is provided a linear light source comprising: a source for producing a beam of radiation; and an elongated light integrating cavity defined by walls having diffusely-reflecting interior surfaces, the walls having an input port through which the beam is introduced into the cavity and an output slot generally parallel to a longitudinal axis of the cavity, the beam being introduced into the cavity through a high collection non-imaging optical device having a hollow bore and reflective walls for concentrating the entering beam toward the cavity.

In one embodiment of the present invention, the light source includes a solid illumination body having an elongated light integrating cavity with diffusely reflective cavity walls formed within the illumination body. Light is introduced into an input port in the cavity through a high collection non-imaging optical device formed as a hollow bore within the illumination body, and a line of diffuse light exits the cavity through an output slot which is parallel to a longitudinal axis of the integrating cavity. In a further aspect of the invention, the cavity includes a generally cylindrical surface portion and generally planar portions adjacent the output slot which are disposed at an angle of about 45° to the optical axis of the exit beam.

A principal advantage of the disclosed invention is that it is a highly efficient linear light source that permits a high degree of light concentration. A further advantage is that both the integrating cavity and the high collection non-imaging optical device are formed in a compact unitary body that is easy to manufacture and emplace in machinery. A further advantage is that it is particularly effective in suppressing the effects of film surface damage, such as a scratch, on a reproduced image. The light source includes an integrating cavity in which the walls adjacent the output slot are constructed such that the light source can be closely positioned adjacent the film in a scanner, thereby providing an optimal distribution of light on the film and achieving a high degree of scratch suppression, while minimizing obstruction of the space near the film. The linear light source of the present invention produces an intense line of light having a highly uniform intensity along its length and a substantially uniform angular distribution.

Other features and advantages of will become apparent upon reference to the following description of the preferred embodiment when read in light of the attached drawings.

DESCRIPTION OF THE PREFERRED EMBODIMENT

Figure 1:
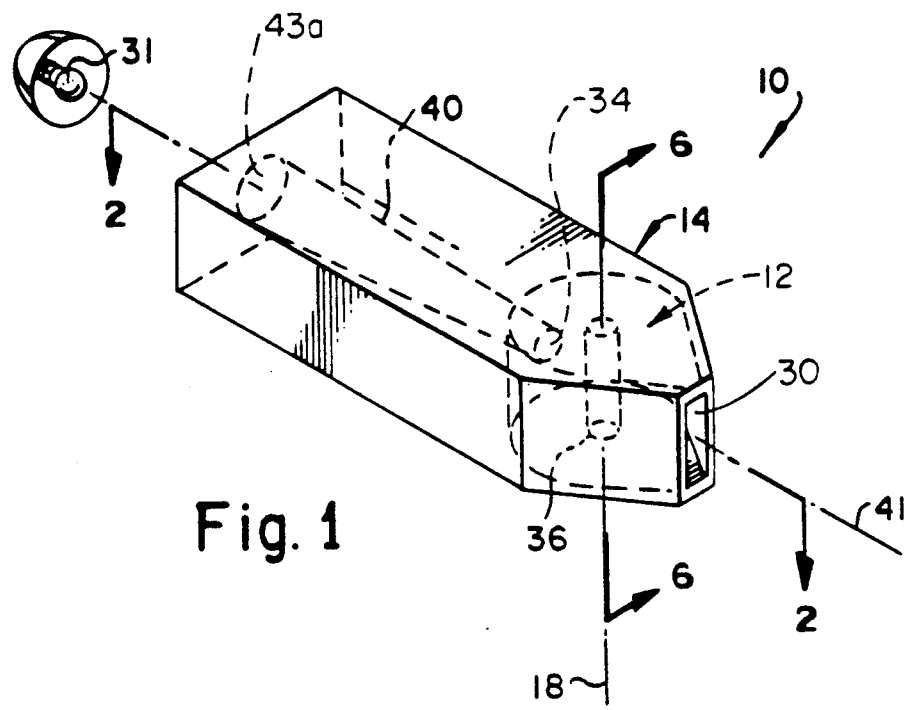
FIG. 1 is a perspective view of the linear light source of the present invention.
Figure 2:
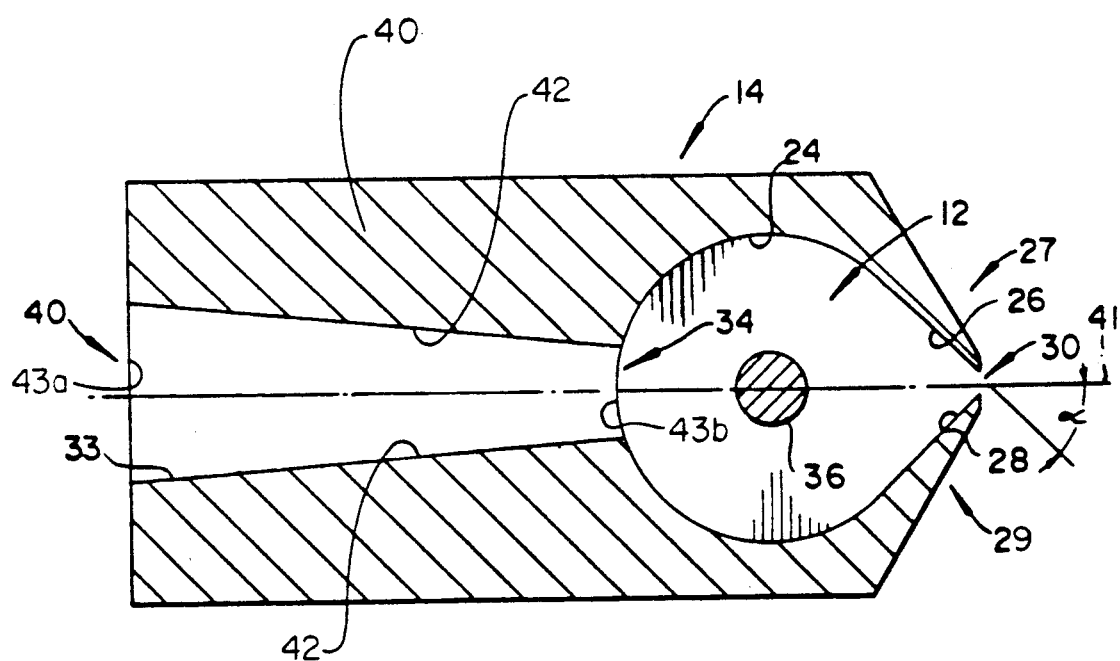
FIG. 2 is a sectional view, taken along the line 2—2 in FIG. 1, showing a conical high collection non-imaging optical device.

With reference to FIGS. 1-2, there is shown a linear light source 10 constructed in accordance with the present invention. Light source 10 includes a solid body 14 having an elongated integrating cavity 12 formed therein about a longitudinal axis 18. The cavity 12 is formed by a generally cylindrical wall surface 24 and two generally planar wall surfaces 26 and 28 in wall portions 27 and 29, respectively. Wall portions extend to form an exit slot 30. Light from a source 31 is provided to cavity 12 through an input port 34, and a line of light is emitted from cavity 12 through an exit slot 30. A baffle 36 is located along the longitudinal axis 18 to prevent light from passing directly from the input port 34 to the exit slot 30. Light source 10 is adapted to function with lamp 31 as the source of radiation, and lamp 31 can be, for example, a xenon lamp. One suitable xenon lamp is a Model No. LX-300f, manufactured by ILC Cermax Lamps. Other lamps can be used, e.g., a 24 volt DC tungsten-halogen lamp, type ELC, manufactured by General Electric Corporation.

Light from lamp 31 is directed into the input port 34 of cavity 12 through a high-collection non-imaging optical device 40, which includes a volume enclosed by specular reflecting surfaces 42, at least one entry aperture 43a where light can enter, and at least one exit aperture 43b where light can exit. The area of the exit aperture 43b is smaller than the area of the entrance aperture 43a. The shape of the reflecting surfaces 42 is such that the ratio of exiting to entering optical power (watts) exceeds the ratio of exit to entry surface area, and therefore the device can be described as "concentrating" the light. The volume is preferably empty (vacuum or air), and surrounded by the reflecting surfaces 42 and the entry and exit apertures 43a and 43b. One embodiment of a high collection non-imaging optical device 40 is a cone concentrator in the form of a frustum of a cone, as shown in FIG. 2. Optical concentrator 40 comprises conical mirror surfaces 42 supported in a conical, hollow bore 33 in body 14 which extends from the entrance aperture 43a to input port 34 in cavity 12. In the present embodiment, the mirror surfaces 42 are provided by reflective tape.

Figure 3A:
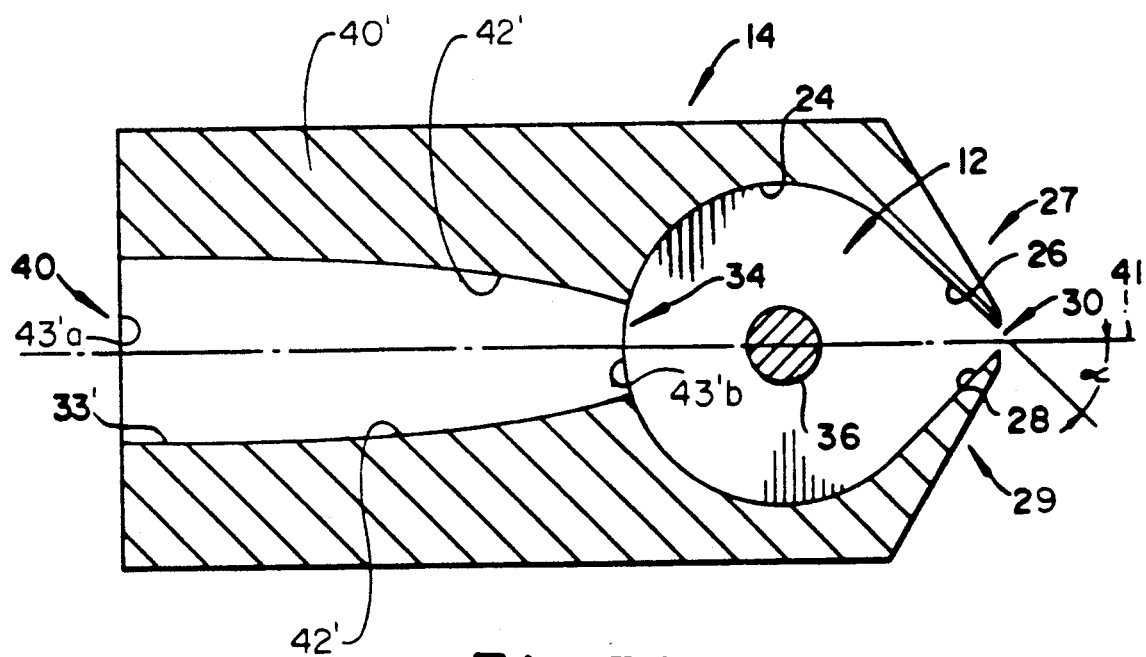
FIG. 3A is a sectional view of another embodiment of the linear light source of FIG. 1, taken along line 2—2 in FIG. 1, showing a parabolic high collection non-imaging device.
Figure 3B:
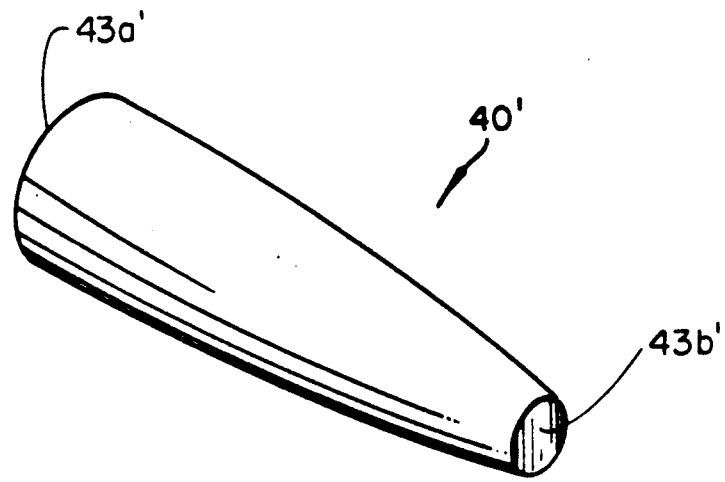
FIG. 3B is a perspective view of a high collection non-imaging device such as shown in FIG. 3A.

Another embodiment of a high collection non-imaging optical device is a curved wall concentrator, which is shown in the form of a compound parabolic concentrator 40' in the cross-sectional view of FIG. 3A and in the perspective view of FIG. 3B. Further detail of compound parabolic concentrators is given in the publication "High Collection Non-Imaging Optics", Welford and Winston, Academic Press, Inc. (1989). Optical concentrator 40' comprises paraboloid mirror surfaces 42' supported in the paraboloid bore 33' in body 14 which extends from the entrance aperture 43a' to input port 34 in cavity 12. Alternatively, a solid compound parabolic concentrator, composed of transparent material such as glass, such as shown in FIG. 3B, will provide improved performance in accordance with the invention. While a solid cone possesses the disadvantages mentioned in connection with the Weisglass patent, a solid curved wall concentrator possesses fundamental advantages over the solid cone. Consequently, a variation of the invention is a non-conical high collection non-imaging optical device formed of a solid dielectric (e.g. glass), with portions of the surface designated as entry and exit regions for the light, and using total internal reflection at the surface 42' instead of mirrors. The end surfaces of the solid non-conical high collection non-imaging optical device may either be flat, or curved to act as lenses. Alternatively, the high collection non-imaging optical device may be a combination of empty and dielectric volumes, surrounded completely or partially (or not at all) by mirrored surfaces. Other volumes may be preferred in some cases over a paraboloid or cone. If, as in the optical configuration shown in FIG. 1, the source 31 is at a finite distance from the entrance to the concentrator, the preferred concentrator for a source at a finite distance has the cross section of an ellipse (as pointed out on pages 84-86 of Welford and Winston).

Figure 7:
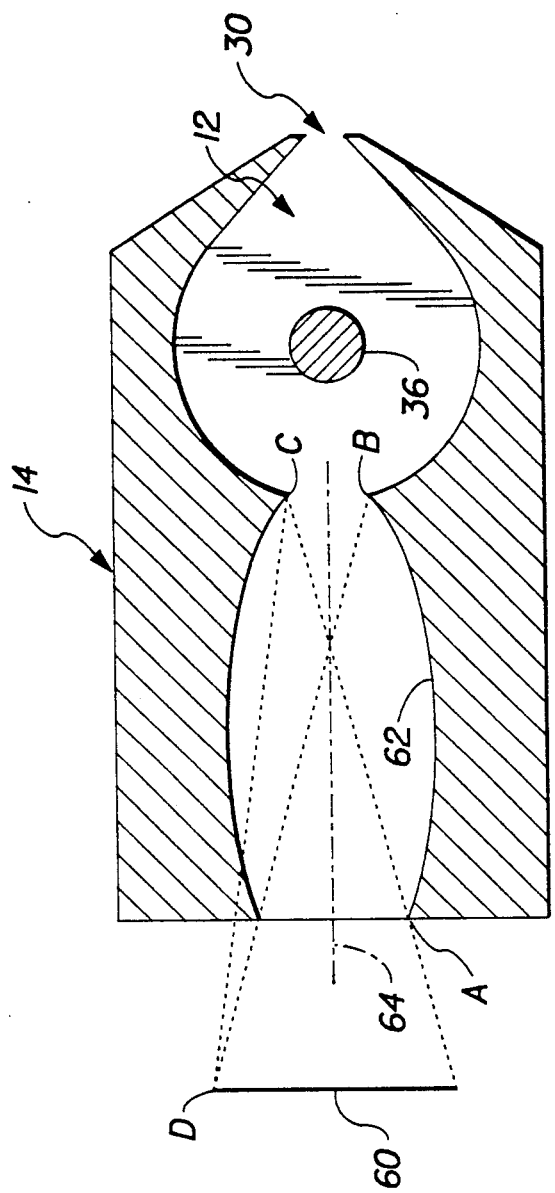
FIG. 7 is a sectional view of another embodiment of the linear light source of FIG. 1, taken along line 2—2 in FIG. 1, showing an elliptical high collection non-imaging device.

Typical use of an elliptical concentrator is shown in cross-section in FIG. 7 in relation to the elongated integrating cavity 12 and a filament 60 of the light source 31. The elliptical concentrator includes an elliptical profile 62 formed into three dimensions by rotating a two-dimensional portion of an ellipse (shown as section AB) around an axis 64. As described in Welford and Winston, pp. 84-86, the two-dimensional portion AB has elliptical foci at D (the end of the filament 60) and C. Rather than a lamp filament 60, a spot of light (e.g., from a projector bulb) may appear at the position of the lamp filament.

The body 14 of linear light source 10 is preferably made from aluminum, and the light-contacting surfaces within the cavity 12 are painted with Spectraflect ™ paint which is a highly reflective diffuse white paint; this paint is obtainable from the Labsphere Corporation. In one exemplary device, the cavity 12 is 27 millimeters long and the cylindrical wall portion 24 is 35.54 millimeters in diameter. The input port 34 is a round hole 12.5 millimeters in diameter, and exit slot 30 is 2 ½ millimeters wide by 27 millimeters long.

The baffle 36 keeps any input light from exiting the cavity 12 without reflecting off of at least one internal cavity surface. Baffle 36 can be, for example, cylindrical, rectangular, or triangular, in cross-section. All internal surfaces of cavity 12, including surfaces of baffle 36, are highly reflective diffuse surfaces. The position and size of the baffle 36 permits the position of the input light to the cavity 12 to be non-critical. The preferred position for the input is centered relative to the output slot 30. Thus, light input to cavity 12 can be perpendicular to, or colinear with, an optical axis 41 of the output beam from cavity 12.

Temporal control of the illumination intensity of the radiation source (not shown) can be achieved by sampling the diffuse light from the integrating cavity 12. Such a system is disclosed in the aforementioned U.S. Pat. No. 4,868,383, and the disclosure of this patent is expressly incorporated herein by reference. As disclosed in this patent, a feedback port can be provided in the integrating cavity 12 to remove a sample of the diffuse light. The light exiting the feedback port is directed by means of an optical fiber to a photosensor such as a silicon photodiode. The output from the photodiode is provided through a feedback circuit to a power supply for the radiation source.

Planar walls 27 and 29 are arranged to make it possible to closely position the light source 10 adjacent the film in a scanner, thereby achieving an optimal distribution of light and a high degree of scratch suppression, while minimally obstructing the space near the film. Walls 27 and 29 have interior surfaces 26 and 28 which are disposed at an angle a (FIG. 2) of about 45° to optical axis 41. As shown in FIG. 2, walls 27 and 29 give the light source 10 a generally wedge shape adjacent slot 30. As a result of this wedge shape, mechanical interference with other elements of a film gate (not shown) is minimized. A further advantage of this shape is that it allows minimum air space between the output slot 30 and the film. Diffuse illumination of the film at angles extending out to approximately ±45° will provide good scratch suppression; this dictates that the output slot width in light source 10 be approximately two times the distance from slot 30 to film 45. By reducing the distance from slot 30 to film 45, the size of the slot 30 can be minimized which produces higher radiance and better uniformity. Linear light source 10 is suitable for use in a rotary scanner having a dynamic film gate, as disclosed, for example, in U.S. patent application Ser. No. 559,481, entitled "Film Scanner," filed in the name of Fettennan et al. on Jul. 27, 1990.

Figure 4:
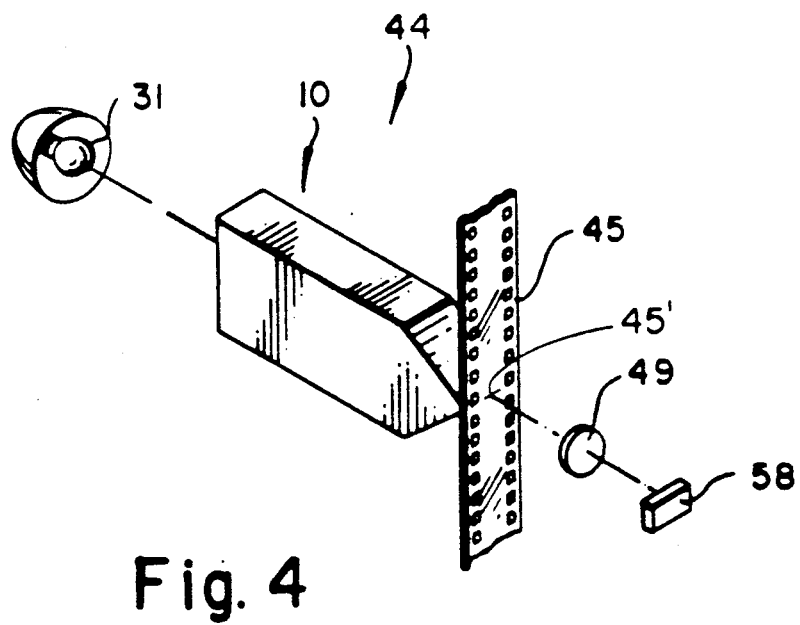
FIG. 4 is a perspective view showing the present invention in an input scanner.
Figure 5:
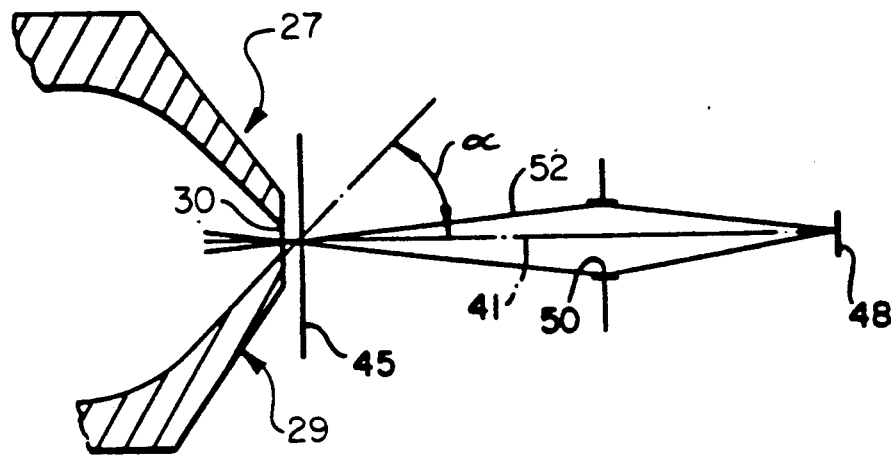
FIG. 5 is a sectional view, taken along the line 2—2 in FIG. 1, showing the light which enters the lens aperture in a plane perpendicular to the line of illumination from the integrating cavity.
Figure 6:
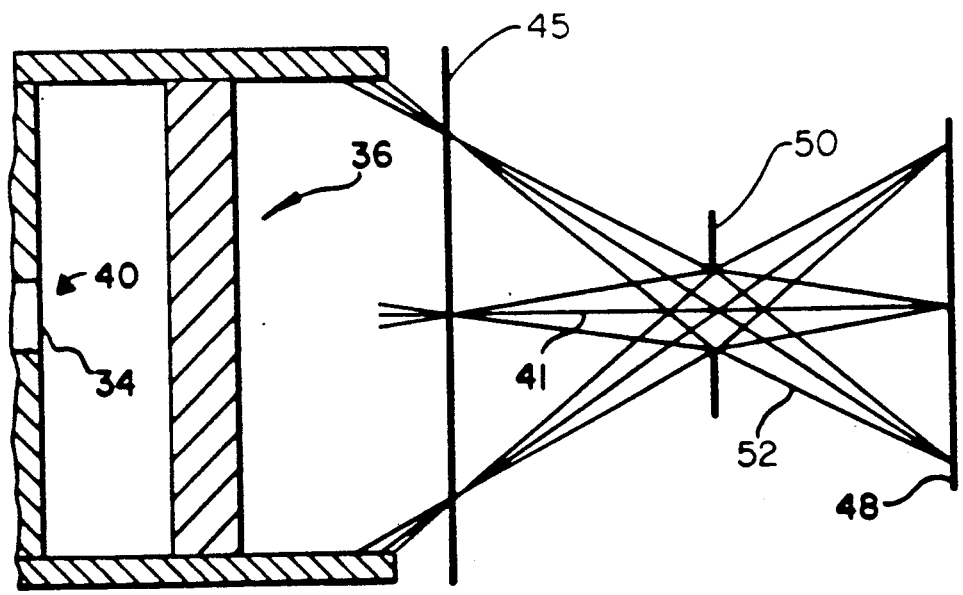
FIG. 6 is a sectional view, taken along the line 6—6 in FIG. 1, showing the light which enters the lens aperture in the plane of the line of illumination from the integrating cavity.

Linear light source 10 can be used in an input scanner such as scanner 44 shown in FIG. 4. Scanner 44 comprises a lamp 31 which produces a beam that is projected into light source 10. Light exiting slot 30 of light source 10 forms a line 45' of diffuse light on film 45. Light transmitted through film 45 passes through an imaging lens 49 which focuses the light on a photodetector such as CCD 58. The film 45 is moved in a cross-scan direction to scan the length of the film 45. With reference to FIGS. 5 and 6, the light from slot 30 entering an aperture 50 of lens 49 is shown for two orthogonal planes. Beam 52 is projected through film 45 and is imaged on the photodetector (not shown in FIGS. 5 and 6) which would be located at an image plane 48. In the plane perpendicular to the line of illumination, shown in FIG. 5, the beam 52 would pass through aperture 50 and would be focussed to a point at image plane 48. In the plane of the line of illumination, shown in FIG. 6, beam 52 would impinge on film 45 in the form of a line of light, be transmitted through the film 45, and then be imaged along the length of a photodetector at image plane 48.

The baffle 36 may be eliminated by relocating the input port 34 at a position other than 180° opposite the exit port 30 of the cavity. In this case, some small amount of light travels directly from input port 34 to exit slot 30 without even a single reflection within cavity 12.

In another embodiment, the lamp 31 is incorporated inside the high-collection non-imaging device 40, as shown in Welford and Winston pages 206 and 107.

The invention has been described in detail with particular reference to certain preferred embodiments thereof, but it will be understood that variations and modifications can be effected within the spirit and scope of the invention.

We claim:

1. A linear light source comprising:
    a source for producing a beam of radiation; and
    an elongated light integrating cavity defined by cavity walls having a diffusely-reflecting interior surface, said cavity walls having an input port through which said beam is introduced into said cavity and an output slot generally parallel to a longitudinal axis of said cavity, the beam being introduced into said cavity through a high collection non-imaging optical device having a hollow bore and reflective concentrator walls for concentrating the entering beam toward the input port of said cavity.

2. A linear light source, as defined in claim 1 wherein the interior surfaces of said cavity walls adjacent said output slot are generally planar and form an angle with an optical axis, said optical axis being generally perpendicular to said longitudinal axis.

3. A linear light source, as defined in claim 2, wherein said cavity walls have exterior surfaces adjacent said output slot which are at generally the same angle to said optical axis as said interior surfaces of the cavity walls adjacent said output slot.

4. A linear light source, as defined in claim 2, wherein said interior surfaces of the cavity walls adjacent said output slot are joined by a generally cylindrical surface.

5. A linear light source, as defined in claim 4, wherein said interior surfaces of the cavity walls adjacent said output slot are tangent to said cylindrical surface.

6. A linear light source, as defined in claim 4, wherein said input port is located in said cylindrical surface.

7. A linear light source, as defined in claim 1, wherein said cavity is further defined by end pieces which are generally perpendicular to said longitudinal axis.

8. A linear light source, as defined in claim 1, wherein the reflective concentrator walls of the high collection non-imaging optical device define a conical concentrator surface.

9. A linear light source, as defined in claim 1, wherein the reflective concentrator walls of the high collection non-imaging optical device define a parabolic concentrator surface.

10. A linear light source, as defined in claim 1, wherein the reflective concentrator walls of the high collection non-imaging optical device define an elliptical concentrator surface.

11. A linear light source comprising:
a source for producing a beam of radiation; and
an elongated light integrating cavity formed in a solid body, said cavity defined by cavity walls having a diffusely-reflecting interior surface, said cavity walls having an input port through which said beam is introduced into said cavity and an output slot generally parallel to a longitudinal axis of said cavity, the beam being introduced into said cavity through a high collection non-imaging optical device formed as a hollow bore in said solid body for directing light from the source to the input port of the cavity, said optical device having reflective collection walls lining the inner dimension of the bore, the beam being introduced through the optical device and into the cavity such that the beam undergoes at least one diffuse reflection before exiting the output slot.

12. A linear light source, as defined in claim 11, wherein the interior surfaces of said cavity walls adjacent said output slot are generally linear and form an angle with an optical axis, said axis being generally perpendicular to said longitudinal axis.

13. A linear light source, as defined in claim 12, wherein said cavity walls have exterior surfaces adjacent said output slot which are at generally the same angle to said optical axis as said interior surfaces of the cavity walls adjacent said output slot.

14. A linear light source, as defined in claim 12, wherein said interior surfaces of the cavity walls adjacent said output slot are joined by a generally cylindrical surface.

15. A linear light source, as defined in claim 14, wherein said interior surfaces of the cavity walls adjacent said output slot are tangent to said cylindrical surface.

16. A linear light source, as defined in claim 14, wherein said input port is located in said cylindrical surface.

17. A linear light source, as defined in claim 11, wherein said cavity is further defined by end walls which are generally perpendicular to said longitudinal axis.

18. A linear light source, as defined in claim 11, wherein the reflective collection walls of the high collection non-imaging optical device define a conical surface.

19. A linear light source, as defined in claim 11, wherein the reflective collection walls of the high collection non-imaging optical device define a parabolic surface.

20. A linear light source, as defined in claim 11, wherein the reflective collection walls of the high collection non-imaging optical device define an elliptical surface.

21. A linear light source for use in a film scanner in which the light source is adapted to produce a line of illumination on a film which is spaced a predetermined distance from the light source, said light source comprising:
a source for producing a beam of radiation;
a solid illumination body interposed between the source and the film;
an elongated light integrating cavity formed in the solid illumination body, said cavity defined by cavity walls having diffusely-reflecting interior surfaces, said cavity walls having an input port through which said beam is introduced into said cavity and an output slot through which said beam exits, said output slot being generally parallel to a longitudinal axis of said cavity and the interior surfaces of said cavity walls adjacent said output slot being at an angle of about 45° to an optical axis which is generally perpendicular to said longitudinal axis; and
a high collection non-imaging optical device formed as a hollow bore within said solid illumination body for directing light from the source to an exit opening near the input port of the cavity, said optical device having reflective collection walls on the inside of the bore for concentrating the beam toward the exit opening.

22. A linear light source, as defined in claim 21, wherein said high collection non-imaging optical device includes an entrance opening, larger than said exit opening, for collecting light from the source.

23. A linear light source, as defined in claim 21, wherein the reflective collection walls of the high collection non-imaging optical device define a conical concentrator surface.

24. A linear light source, as defined in claim 21, wherein the reflective collection walls of the high collection non-imaging optical device define a parabolic concentrator surface.

25. A linear light source, as defined in claim 21, wherein the reflective collection walls of the high collection non-imaging optical device define an elliptical concentrator surface.

26. A linear light source comprising:
a source for producing a beam of radiation; and
an elongated light integrating cavity defined by cavity walls having diffusely-reflecting interior surfaces, said cavity walls having an input port through which said beam is introduced into said cavity and an output slot generally parallel to a longitudinal axis of said cavity, the beam being introduced into said cavity through a high collection non-imaging optical device having curved walls for concentrating the entering beam toward the input port of said cavity.

27. A linear light source, as defined in claim 26, wherein the curved walls of said high collection non-imaging optical device have a paraboloid shape.

28. A linear light source, as defined in claim 27, wherein said paraboloid shape is that of a compound parabolic concentrator.

29. A linear light source, as defined in claim 27, wherein said paraboloid shape is hollow and the curved walls are reflective walls for concentrating the entering beam toward said cavity.

30. A linear light source, as defined in claim 26, wherein said high collection non-imaging optical device is filled with a dielectric providing total internal reflection of the entering beam from the curved walls of the device.

31. A linear light source, as defined in claim 30, wherein the end surfaces of the high-collection non-imaging optical device are either flat or curved to act as lenses.

32. A linear light source, as defined in claim 26, wherein said curved walls are optimized for reflecting light from a source at a finite distance from the optical device.

33. A linear light source, as defined in claim 32, wherein said curved walls have an elliptical shape.

34. A linear light source, as defined in claim 26, wherein said high collection non-imaging optical device totally or partially encloses the source of radiation.

* * * * *